G. F. HOOS.
CLOTHES LINE SUPPORT.
APPLICATION FILED AUG. 2, 1915.
1,166,212.
Patented Dec. 28, 1915.
4 SHEETS—SHEET 1.
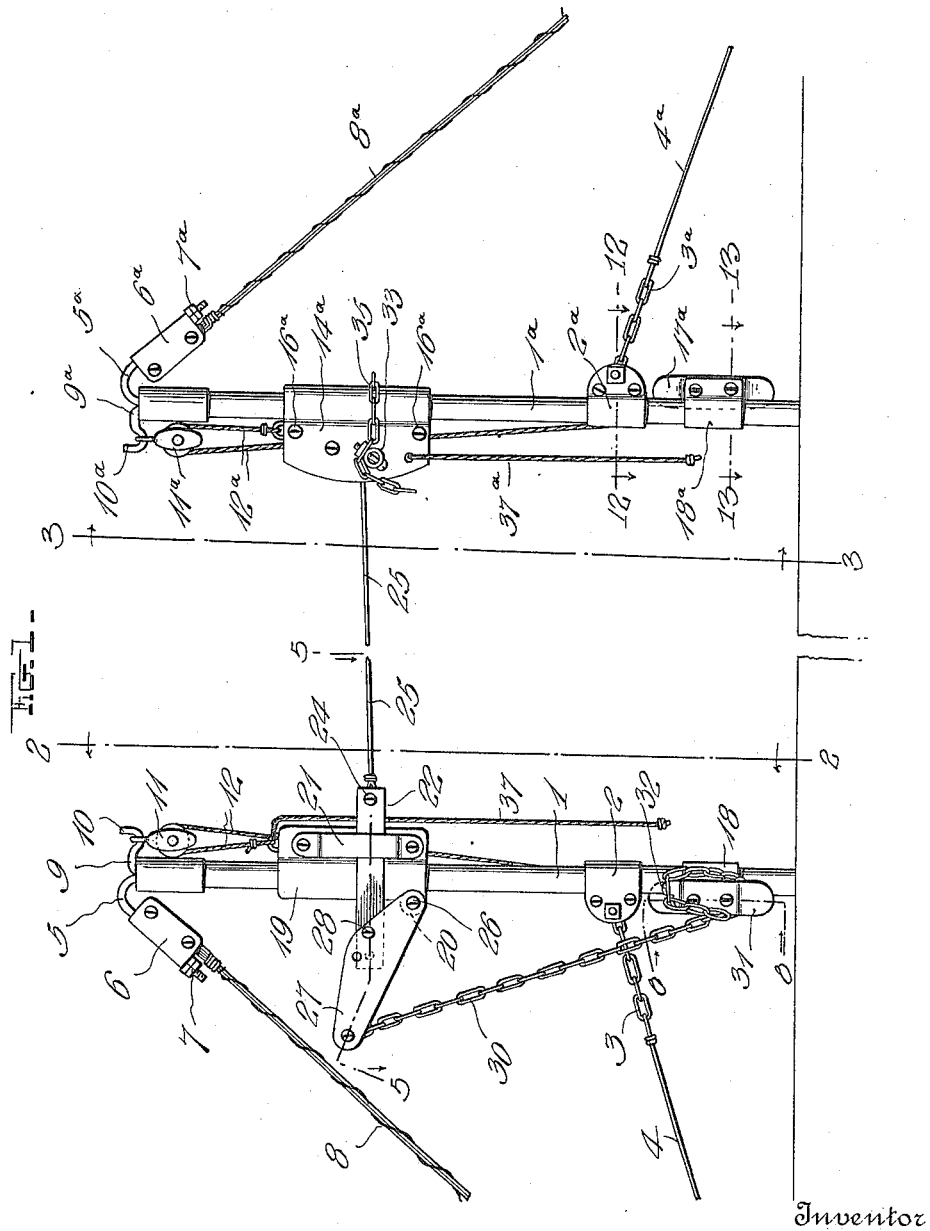
Witnesses
H. Woodard
Inventor
George F. Hoos
By H. B. Willson & Co.
Attorneys

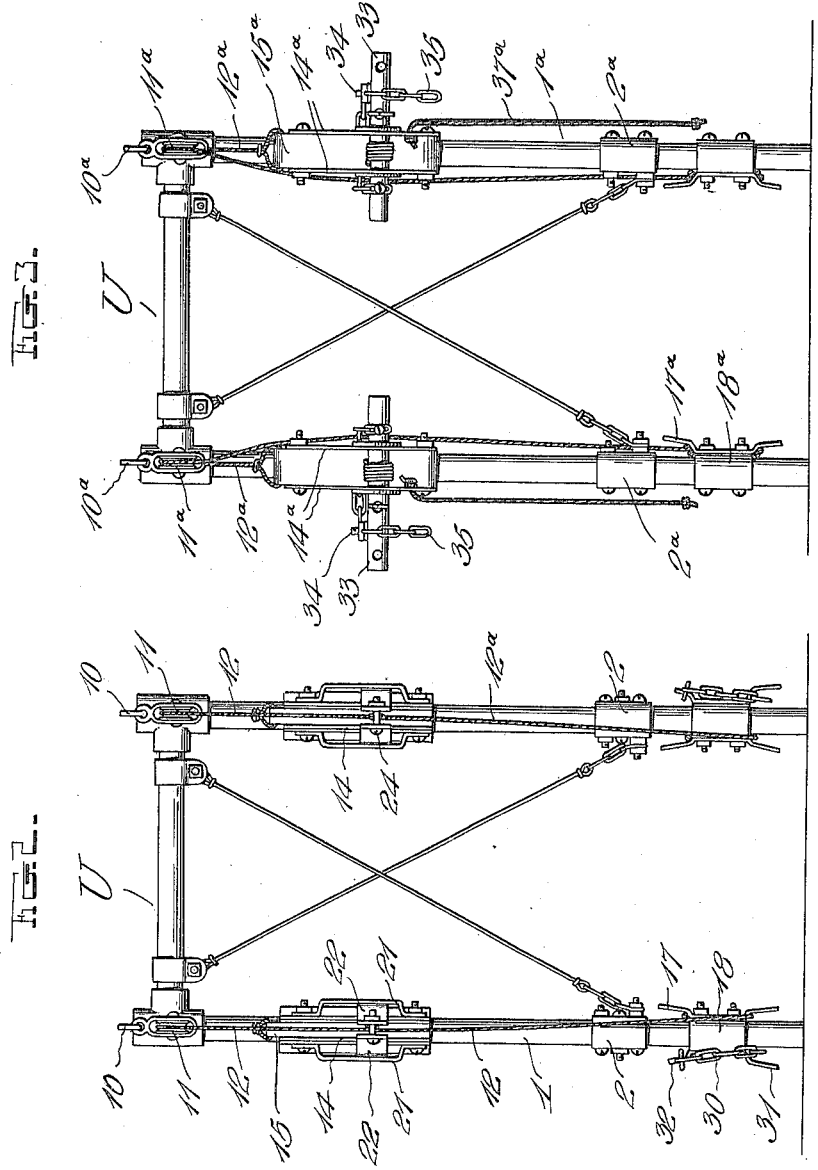

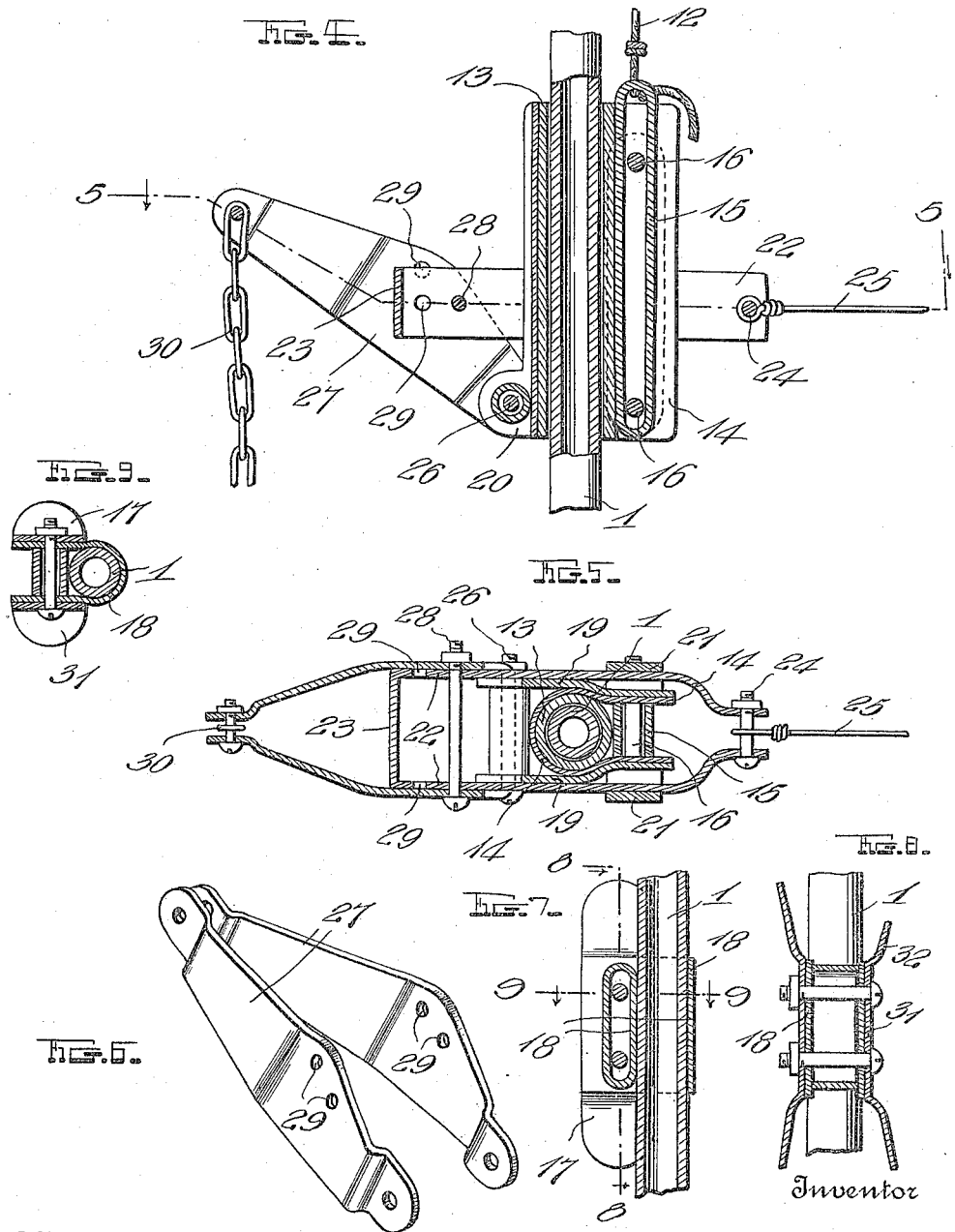

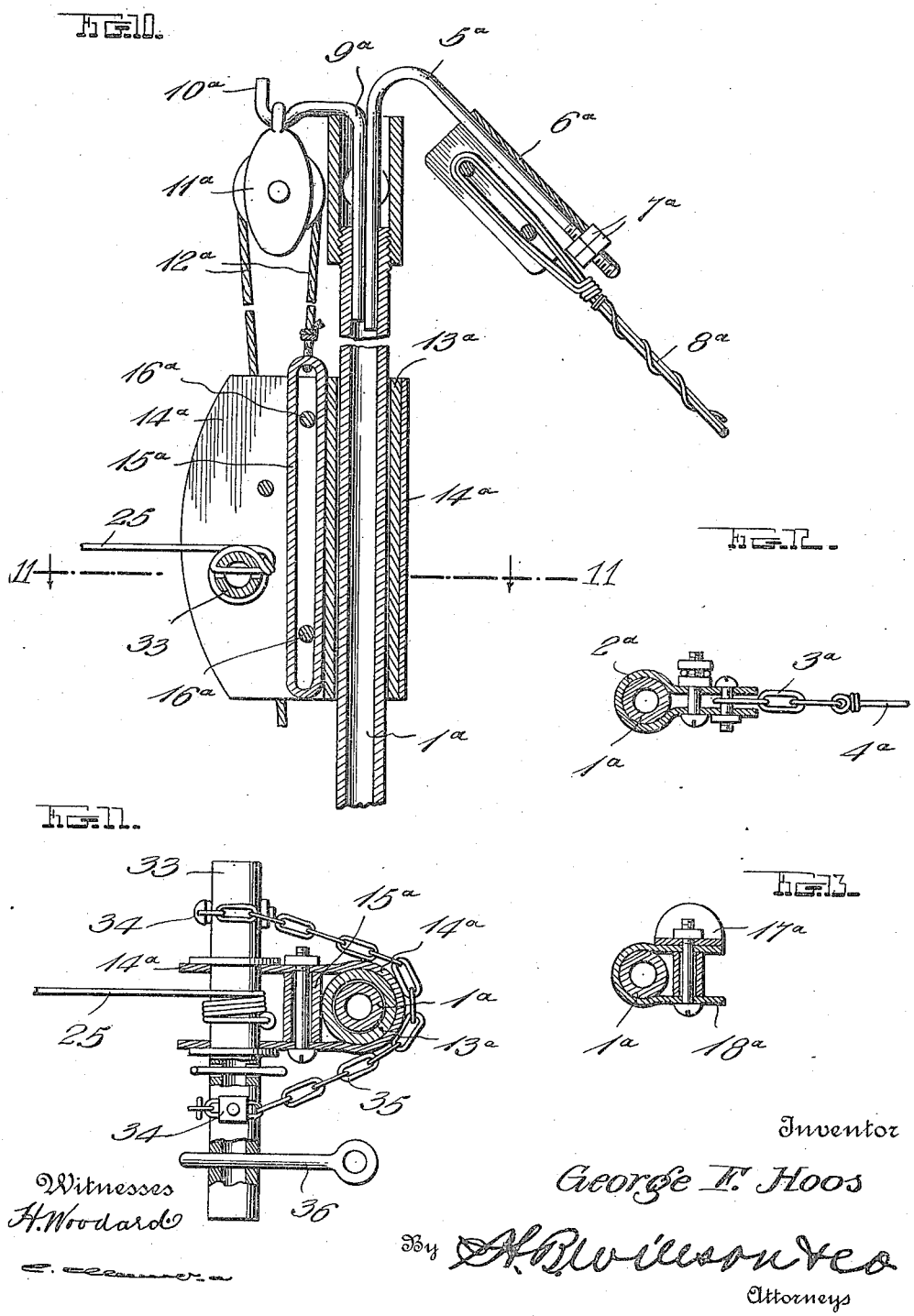

UNITED STATES PATENT OFFICE.

GEORGE F. HOOS, OF FALLS CITY, NEBRASKA.

CLOTHES-LINE SUPPORT.

1,166,212.

Specification of Letters Patent.

Patented Dec. 28, 1915.

Application filed August 2, 1915. Serial No. 43,183.

*To all whom it may concern:*

Be it known that I, GEORGE F. HOOS, a citizen of the United States, residing at Falls City, in the county of Richardson and State of Nebraska, have invented certain new and useful Improvements in Clothes-Line Supports; and I do declare the following to be a full, clear, and exact description of the invention, such as will enable others skilled in the art to which it appertains to make and use the same.

My invention relates to improvements in clothes line supports and has for its main object to provide simple and efficient means whereby the line may be raised and lowered at will and to provide at one end of the line a permanent slack take-up device, and at the other end thereof, a temporary line take-up.

Other objects are to construct the numerous elements of the invention in a comparatively simple, yet highly efficient manner.

With this general object in view, the invention resides in certain novel features of construction, and in unique combinations of parts to be hereinafter more fully described and claimed, the descriptive matter being supplemented by the accompanying drawings wherein:

Figure 1 is a side elevation of a clothes line support constructed in accordance with the invention; Figs. 2 and 3 are vertical transverse sections as seen along the plane indicated respectively by the lines 2—2 and 3—3 of Fig. 1; Fig. 4 is a detail vertical section through a portion of one of the standards and the temporary line take-up devices thereon; Fig. 5 is a horizontal sectional view taken on the plane indicated by the irregular line 5—5 of Figs. 1 and 4; Fig. 6 is a perspective view of a pair of the line tightening levers; Fig. 7 is a detail vertical section through the lower end of one of the standards and the clip thereon; Fig. 8 is an additional vertical section taken on the plane designated by the line 8—8 of Fig. 7; Fig. 9 is a detail horizontal section as viewed on the plane indicated by the line 9—9 of Fig. 7; Fig. 10 is an enlarged vertical section through the upper end of one of the standards, the slide thereon, and the permanent line take-up device; Fig. 11 is a horizontal section as seen on the plane of the line 11—11 of Fig. 10; and Figs. 12 and 13 are horizontal sections taken on the planes indicated by the lines 12—12 and 13—13 of Fig. 1.

In these drawings which constitute a part of the application and in which like reference characters designate corresponding parts throughout the several views, the invention is shown as consisting of a plurality of units U connected together, two of such units being shown. However, since the construction of each of the units is the same, but one will be described. To this end, 1 and 1ª designate a pair of spaced upright standards, each in the form of a pipe having its lower end anchored in the earth in any preferred manner, concrete anchors being used.

Secured to the lower end portions of the standards 1 and 1ª are the U-shaped clips 2 and 2ª to which chains 3 and 3ª are connected by one of the series of bolts used to secure the clips on the standard. Secured to the chains at one end, and adapted to have their other end secured to an appropriate anchor, is a pair of bracing cables or wires 4 and 4ª. By this means, the intermediate portions of the standards 1 are effectively held against yielding.

Hooked in the upper ends of the standard 1, is a pair of hooks 5 and 5ª upon whose shanks clips 6 and 6ª are secured, said shanks being shown as equipped with clamping nuts 7 and 7ª whereby the clips may be adjusted longitudinally thereon in order that the additional bracing wires or cables 8 and 8ª may be tightened, the members 8 and 8ª being preferably secured to the clips as shown in Fig. 10, and being adapted for permanent attachment to the rigid anchors, preferably to the same device to which the wires 4 and 4ª are connected. Likewise inserted in the upper ends of the standards 1 and 1ª, is a pair of rods 9 and 9ª whose upper ends are bent laterally and then upwardly to provide a pair of hooks 10 and 10ª upon which pulleys 11 and 11ª are suspended. The pulleys 11 and 11ª support a pair of ropes or cables 12 and 12ª whose utility is yet to be set forth.

Slidably mounted on the respective standards 1 and 1ª, are the tubular slides 13 and 13ª which are preferably formed by sections of piping, said slides being embraced by the intermediate portions of plates 14 and 14ª which are bent around said slides upon their upright centers and whose end portions extend in parallel relation from such slides, said portions of each plate being spaced by the vertical elongated open links 15 and 15ª through which and through such end portions, clamping bolts 16 and 16ª are passed, whereby not only to clamp the two plates around their respective slides, but to rigidly secure the links in position. It is to the upper ends of the links 15 and 15ᵃ that one end of the cables 12 and 12ᵃ is connected.

The other ends of the cables 12 and 12ᵃ may be releasably anchored by winding the same around cleats 17 and 17ᵃ which are carried by U-clips 18 and 18ᵃ secured around the standards below the clips 2 and 2ᵃ. Thus it will be seen that the two slides 13 and 13ᵃ and the parts carried thereby may be shifted vertically at will and held in adjusted position.

Secured one in contact with each end portion of the plate 14, and having ears 20 at their lower corners extending beyond the bend of said plate, is a pair of additional plates 19 to whose outer sides a pair of upright guide yokes 21 is secured, said yokes receiving slidably therein horizontal links 22 which are integrally connected at one end as shown at 23, while the opposite ends of such links are united by a bolt or the like 24 which passes through a loop on one end of the clothes line 25.

Fulcrumed one adjacent each ear 20 upon a transverse bolt 26 which passes through said ears, is a pair of angular line tightening levers 27 which normally incline upwardly but are adapted to be moved in a downward direction to tighten the line 25, the opposite end of this line being anchored in a manner yet to be described. In most cases, the bolt 28 which connects the lines 22 to the levers 27, will be insertible through a number of variably spaced openings 29 in the levers and links, whereby a certain amount of slack in the line 25 may be taken up.

Secured at one end between the free ends of the levers 27, is a lever acting chain 30 which is to be passed beneath an upright cleat 31 secured to the clip 18 and to have certain of its links passed over an ear 32 rising from the upper end of said cleat. By this means, the levers 27 may be operated at will regardless of the height at which they are normally disposed, thereby tightening or loosening the line 25 according to requirements.

Rotatably mounted in a pair of alined openings formed through parallel end portions of the plate 14ᵃ, is a windlass 33 preferably formed of a piece of piping whose ends project beyond said end portions of the plate and are releasably connected by bolts 34 to the opposite ends of a chain 35 which passes around the bend of plate 14ᵃ and holds the windlass against rotating. The windlass in question is provided for permanent adjustment of the line 25, such line being connected between the ends of the plate 14ᵃ, the windlass being capable of rotating a removable handle 36, (see more particularly Fig. 11), when one of the bolts 34 is removed. After proper adjustment of the line has been made, however, the detached end of the chain 35 is again secured by reinsertion of the aforesaid bolt, and thus the windlass will be so held as to prevent unwinding of the line therefrom.

In use, the two slides 13 and 13ᵃ may be lowered at will for placing of the clothes thereon, it being first necessary to slacken the line by releasing the chain 30, and in some cases to pull downwardly upon a pair of ropes or the like 37 and 37ᵃ in case the slides should bind upon the standards. When the slides are lowered, the clothes are placed on the line, and the cables 12 and 12ᵃ are again operated to raise the slides and to hold the same in closed position, and finally the line is tightened by pulling downwardly upon the chain 30 which chain is then secured in the manner above described and shown most clearly in Fig. 1 of the drawings.

In the drawings, I have shown certain specific details of construction for accomplishing probably the best results, and in the preceding I have described such details since the same produces a simple, convenient and durable clothes line support, but it is obvious that I need not be limited to any structural details otherwise than to the extent to which the appended claims restrict me.

I claim as my invention:

1. In combination, a pair of spaced upright standards, a slide shiftable vertically on each standard, means for shifting said slide and for locking the same against shifting, a clothes line connected at one end to one slide, a guide yoke carried by the other slide, a horizontal link slidable in said yoke and connected at one end to the other end of the line, a downwardly swinging line tightening lever fulcrumed to the last named slide and pivoted to the link, and releasable means for locking said lever.

2. In combination, a pair of spaced upright standards, a tubular slide shiftable vertically on one standard, a plate bent around said slide on its upright center and having its end portions extended in parallel relation beyond said slide, a pair of plates disposed one in contact with the other side of each of said ends, said plates having parallel ears, bolts passing through the plates and through the aforesaid ends, a pair of connected line tightening levers fulcrumed to said ears, releasable means for locking said levers against movement, a line having connection at one end with said levers, and a slide on the other standard to which the other end of the line is connected.

3. In combination, a pair of spaced upright standards, a tubular slide shiftable vertically on one of the standards, a plate bent around the slide upon its upright center and having its end portions extended therefrom in parallel relation, an open link member interposed between said end portions and in contact therewith, bolts passing through the end portions and through the open link, a guide carried by one standard above the open link, a cable passed around said guide and connected at one end to the upper end of the link, means for releasably anchoring the other end of said cable, an additional slide shiftable vertically on the other standard, means for adjusting the last named slide vertically and for locking the same against movement, and a clothes line stretched between the two slides.

4. In combination, a pair of spaced upright standards, a tubular slide shiftable vertically on one of said standards, a plate bent around said slide upon its upright center, and having its two end portions extended therefrom in parallel relation and provided with alined openings, a windlass passing through said openings, means for rotating said windlass and for locking the same against rotation, clamping bolts passed through the parallel end portions of the plate, an additional slide shiftable vertically on the other standard, means for locking said additional slide against movement, and a clothes line stretched between the two slides.

In testimony whereof I have hereunto set my hand in presence of two subscribing witnesses.

GEORGE F. HOOS.

Witnesses:
E. D. STOUGHTON,
ALICE MURPHY.

Copies of this patent may be obtained for five cents each, by addressing the "Commissioner of Patents, Washington, D. C."